(No Model.)
A. STOVER.
WATER FAUCET.
No. 330,524. Patented Nov. 17, 1885.
Fig. 1.
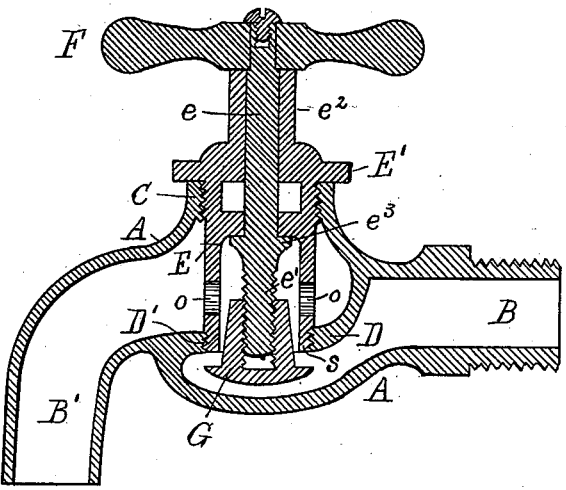
Fig. 2.
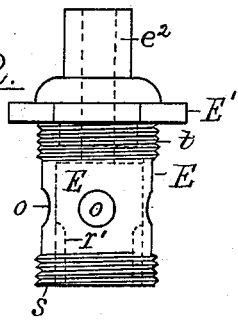
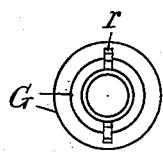
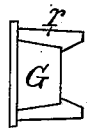
Fig. 4. Fig. 5.
Fig. 3.
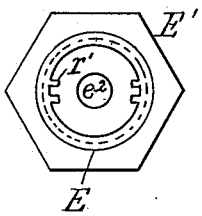
Attest.
L. Lee
Henry J. Thieberath
Inventor.
Atkins Stover, per
Thos. S. Crane, Atty.
N. PETERS, Photo-Lithographer, Washington, D. C.

UNITED STATES PATENT OFFICE.

ATKINS STOVER, OF BROOKLYN, NEW YORK.

WATER-FAUCET.

SPECIFICATION forming part of Letters Patent No. 330,524, dated November 17, 1885.

Application filed July 24, 1884. Serial No. 138,641. (No model.)

*To all whom it may concern:*

Be it known that I, ATKINS STOVER, a citizen of the United States, residing in Brooklyn, Kings county, New York, have invented certain new and useful Improvements in Water-Faucets, fully described and represented in the following specification and the accompanying drawings, forming a part of the same.

This invention consists in an improved construction for the parts of a valve having a separate tubular seat, whereby the valve is located in the inlet-passage so as to be held upon its seat by water-pressure when closed.

The invention will be understood by reference to the annexed drawings, in which Figure 1 is a longitudinal section through the faucet on the center line of the valve-stem. Fig. 2 is a side view of the tubular seat detached from the shell. Fig. 3 is a view of the inner end of the same, and Figs. 4 and 5 are respectively end and side views of the valve detached from its seat and stem.

A is the shell; B, the inlet, and B' the outlet, passages; C, a screw-socket formed at one side of the shell; D, the partition having a threaded aperture, D', formed in it concentric with the socket C.

E is the tubular seat formed to fit the socket C and aperture D', and screwed into one or both of the same in such manner as to prevent the passage of water at either point, its open inner end, $s$, extending through the partition D, and serving as the seat for the valve G. The valve is formed as a solid disk having a tubular nut attached to its inner side, and provided with two parallel ribs, $r\,r$, fitted to guides $r'\,r'$, formed longitudinally within the walls of the tubular seat, between the holes $o$, formed therein as water-outlets. When the stem $e$ is rotated, the valve is thus kept from turning, and is thereby moved to and from the end of the tube E, against which it is pressed at $s$ to close the water-passage. Openings $o$ are formed in the sides of the tube E, from which the water passes to the outlet B', and a wrench-collar, E', is shown at the upper end of the tube for screwing the tube into its place. A valve-stem, $e$, is inserted through the tube, and is formed with a handle, F, at the outer end, and a screw-thread, $e'$, at its inner end, where it is fitted loosely, as is usual in making brass-fittings, into the nut formed inside the valve G. The upper end of the tube is formed with a bearing, $e^2$, for the stem, and the latter is provided inside the bearing with a shoulder, $e^3$, to prevent end motion, so that the rotation of the stem screws the valve up or down upon the thread $e'$, and thereby opens or closes the valve upon its seat $s$. When the valve is open, as in Fig. 1, the passage of the water is from the inlet B through the waterways formed by the seat $s$ and the openings $o$ to the outlet B'. It will be seen that from the construction employed the pressure is secured upon the outer side of the valve when closed without inserting the valve into the shell by an aperture opposite the stem, as in some other constructions. The water-pressure is thus, when the valve is closed, excluded from the valve-stems and its bearings $e^2$, and no packing is required around the stem for an open-mouthed faucet such as is claimed herein.

I am aware of the state of the art shown in United States Patents Nos. 58,503, 94,715, 98,171, 250,667, and 283,660, which show that it is not new to make a valve-seat not tubular, but screwed into the bridge, and that tubular valve-seats also have been held within the valve-shell by various means. I am also aware that a valve has been constructed to press upon the lower side of the seat, as in United States Patent No. 28,596; but in such case the seat has been integral with the valve-shell, and an opening provided with a removable cover has been necessary in the bottom of the shell to introduce the valve beneath the seat. My invention was expressly designed to avoid the expense of this construction, while securing the water-pressure upon the back of the valve to press it to its seat when closed, and I therefore disclaim the patents cited above, as well as the separate elements of my invention, and claim my own construction in the following manner:

The open-mouthed faucet constructed, as herein shown and described, with the shell A, having socket C and partition D, arranged as described, the tubular seat E, extended within the shell and through the partition D, and secured in the partition by a screw-thread, as set forth, the same having the holes $o$ and guides $r'$, and being provided at its inner end with the seat $s$, and constructed in one piece with the bearing $e^2$, projected outside of the socket C, the valve G, provided with internal thread and external ribs, $r$, and arranged within the inlet-passage and seated upon the lower end, $s$, of the removable tubular valve-seat E, and the valve-stem $e$, provided with thread $e'$, fitted loosely to the valve, and secured in the bearing $e^2$ by the handle F and shoulder $e^3$, the whole arranged and operated substantially as and for the purpose set forth.

In testimony whereof I have hereunto set my hand in the presence of two subscribing witnesses.

ATKINS STOVER.

Witnesses:
 THOS. S. CRANE,
 L. LEE.